Dec. 18, 1956     E. J. BETHE     2,774,106
METHOD OF AND APPARATUS FOR FORMING A SHEET OF LATEX FOAM
Filed Dec. 17, 1952     2 Sheets-Sheet 1
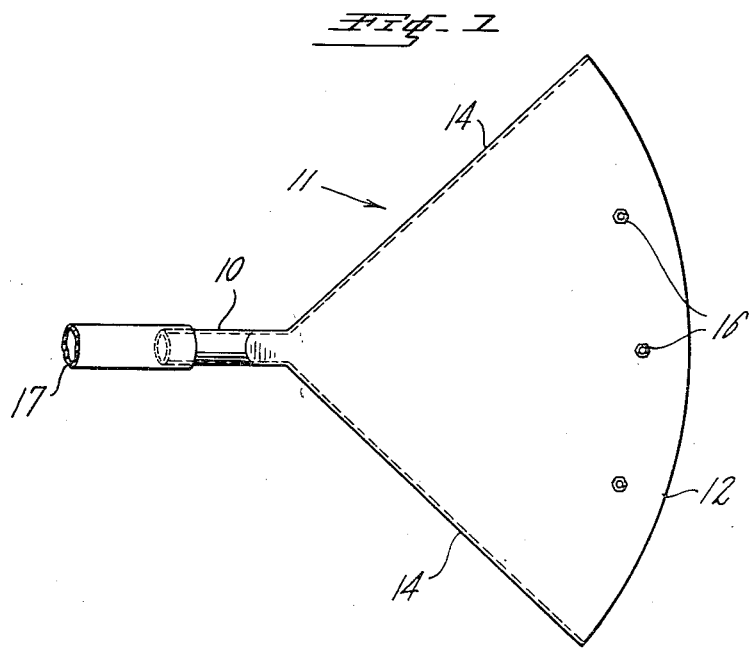
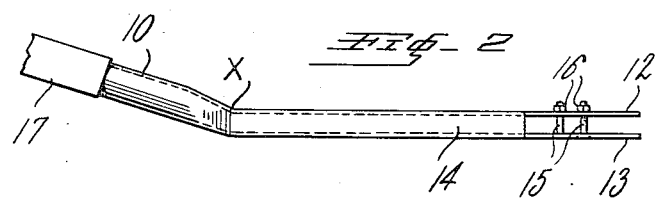
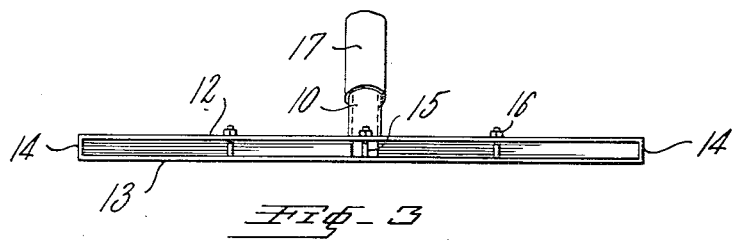
INVENTOR.
EUGENE J. BETHE
BY Charles C. Willson
ATTORNEY

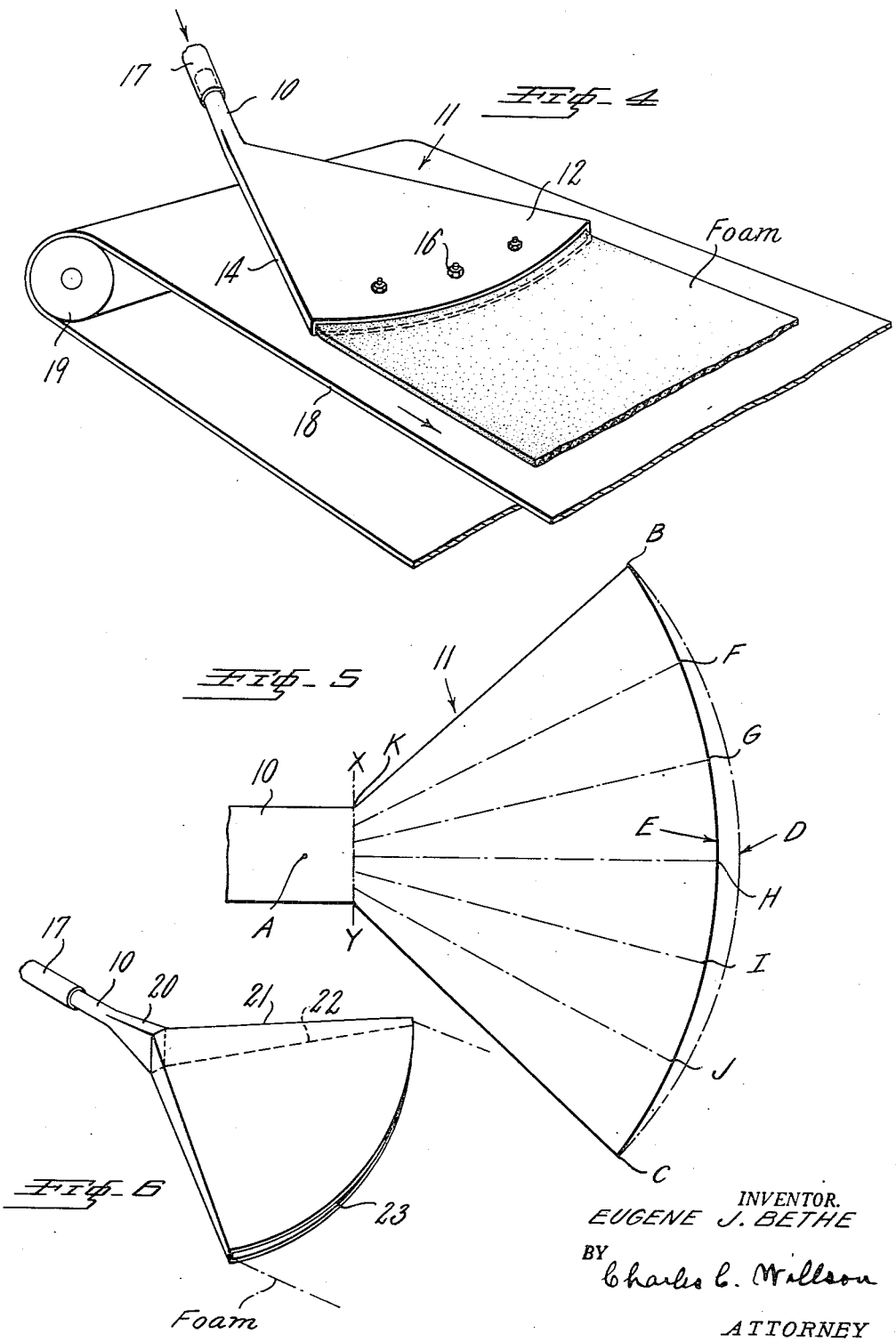

United States Patent Office 2,774,106
Patented Dec. 18, 1956

2,774,106

METHOD OF AND APPARATUS FOR FORMING A SHEET OF LATEX FOAM

Eugene J. Bethe, Mishawaka, Ind., assignor to United States Rubber Company, New York, N. Y., a corporation of New Jersey Application December 17, 1952, Serial No. 326,505

6 Claims. (Cl. 18—12)

This invention relates to the formation of liquid foams into a flat sheet or ribbon, and more particularly to a method and apparatus for extruding latex or other foam into a wide sheet of uniform thickness, density, and bubble size, and which has smooth flat faces.

Latex foam in the form of a vulcanized flat sheet is used extensively in upholstering furniture, as soft porous pads and for other purposes. Such flat latex sheet, commonly called latex "flatstock" has been produced heretofore by using what is known as the "scraper and bank" system, in which a scraper blade is supported at a slight distance above a traveling belt or apron, and a bank of latex foam is maintained against the scraper so that the scraper will control the amount of foam that is spread upon the traveling belt under the scraper.

In this specification the invention will be described in terms of the production of latex foam rubber but it should be understood that the apparatus and method are equally suitable for producing sheets of other frothed liquids, as for example, solutions or aqueous dispersions of urea-formaldehyde resin, polyvinyl resins, polystyrene resins, synthetic rubbers, reclaimed rubbers, etc.

The above mentioned prior method of producing flat sheets of latex foam, while extensively used, is open to a number of objections, one of which is due to the fact that a long gel time is required. If the rate of gellation is too rapid, the bank of foam against the scraper will set up before this foam has been deposited on the advancing belt. The long gel time results in a coarse structure because the soap bubbles in the froth break and combine. A second objection is due to the fact that bubbles of air are entrapped in the foam while it is banked against the scraper, and this tends to make the deposited foam non-uniform. A third objection is due to the fact that coagulum builds up at the bank and scraper, because of static spots in the bank which results in a disfigured surface making the goods unsalable as first quality merchandise. Furthermore the scraper and bank system does not produce flat stock having very smooth outer faces, even when the scraper is not fouled with coagulum.

I have found that these difficulties can be overcome and a wide sheet of latex foam that has a fine bubble size, and is uniform as to thickness, density and bubble size can be produced, by extruding latex foam through a wide mouth extruding nozzle onto a traveling belt. This extruding operation, however, necessitates the use of an extruding nozzle that is different in construction and operation from the ordinary nozzle used for discharging liquids, gases or thick doughy materials. This is because latex foam while fluid is somewhat resistant to flow and the volume emerging from the slot of the extruder is highly sensitive to the resistance to flow in the extruder. Any path of lesser resistance will permit a larger volume of foam to be extruded in that path and consequently the extruded sheet will be thicker at that point. Furthermore, because latex foam is easily compressible, any force which causes the foam to become compressed in a localized area, such as excessive resistance to flow, will compress the foam in that area, and upon emerging from the extruder this foam will expand under atmospheric pressure to a greater extent than the rest of the foam. This, of course, results in a sheet of non-uniform thickness.

In carrying out the present invention an extruding nozzle is used which flares outwardly in the shape of a fan from a tube supply portion of the nozzle to the wide span at the discharge end of the nozzle. This wide span may be three to five feet or more wide in order to deposit a foam sheet of this width on the traveling belt. The thickness of such sheet may be one-fourth inch, one-half inch or one inch or more as desired. The width of the discharge opening in the nozzle may approximate the thickness of the sheet deposited on the belt, but the thickness of this sheet will depend largely on the volume of latex foam forced through the nozzle and the speed of the belt. Therefore the thickness dimension of the slot need not necessarily correspond to the thickness of the sheet. By reducing the rate of flow any sheet thickness less than the thickness of the slot can be obtained. For example sheets from ¼ to ¾" have been extruded through a one inch slot by reducing the volume of foam fed into the extruder. By increasing the rate of flow so that the volume of foam exceeds that required to form a sheet of the thickness of the slot a sheet 1½" has been extruded thru a one inch slot. When the extruder is overloaded in this manner the foam expands immediately upon emerging from the nozzle to a thickness determined by the volume overload.

The extruding nozzle contemplated by the present invention is preferably made of relatively thick metal stock so that the wide span of the nozzle will not be distorted by the pressure of the latex foam therein. The foam may be supplied to the tubular portion of a nozzle under a pressure of ten pounds or more, and should unless overloaded, leave the discharge end of the nozzle at very nearly atmospheric pressure. An important factor in carrying out the present invention is to so design the nozzle that every portion of the latex stream will be under the same pressure as it leaves the discharge end of the nozzle, so that the foam will expand equally throughout the extruded sheet and will be deposited on the belt in uniform thickness.

In order that the extruding nozzle of the present invention will deposit on the traveling belt a wide ribbon of foam of uniform thickness, it is important to so design the outward flaring portion of such nozzle that as the foam spreads laterally in this portion of the nozzle and travels towards the discharge end of the nozzle, each portion of such stream will travel the same distance by the time it reaches the discharge end of the nozzle, so that the same pressure drop will occur in each portion of the stream, and the whole span of the stream will be under uniform pressure as it leaves the discharge end of the nozzle. Any means for equalizing the resistance to flow of foam through the nozzle will accomplish this result.

To provide a nozzle which will operate on latex foam in the manner just described the outward flaring portion of the nozzle is provided with slightly spaced parallel walls having the foam discharge passage therebetween, and these walls terminate at the nozzle discharge end on a curved path that usually differs from the arc of a true circle. This is due to the fact that the arc formed by the curved outer end of the discharge nozzle is so shaped that as the foam spreads laterally in the nozzle and advances along diverging radial lines, each portion of the latex stream advancing in the nozzle will travel a uniform distance from the base of this portion of the nozzle to the discharge end thereof. This nozzle construction serves to deliver each portion of the latex stream to the discharge end of the nozzle so that the pressure and therefore the volume throughout the stream will be uniform as it leaves the nozzle, to thereby avoid unequal expansion of the stream as it is deposited on a traveling belt.

If a flat nozzle such as is commonly used to extrude a non-compressible or hydraulic liquid, should be employed to extrude compressible and expandable foam, the extruded foam sheet would very likely be thicker at the central portion of the stream than at the sides thereof, due to a greater pressure drop in the stream near the sides thereof, caused by frictional contact with the nozzle walls. The present invention contemplates a construction whereby the stream of latex foam will have a uniform pressure throughout when it reaches the discharge end of the wide nozzle so that the foam will have expanded uniformly as it leaves the nozzle.

One important advantage of the extruding procedure of the present invention results from the fact that very little time need expire from the time the gelling agent is added to the latex foam until the foam is deposited on the traveling belt. This results in a more uniform and finer cell structure, avoids coagulation of the latex before it reaches the belt and prevents the undesirable inclusion of air.

A further advantage results from the fact that by using the wide span extruding nozzle herein contemplated, a pressure feed of the latex foam can be used from the time the foam is produced until it leaves the nozzle. This gives excellent control of the operation, and prevents air from reaching the foam while it is fed to the extruding nozzle.

Another advantage obtained by the present invention results from the fact that the extruding nozzle imparts to the extruded foam sheet very smooth foam faces, which is highly desirable.

The above and other features of the present invention will be further understood from the following description when read in connection with the accompanying drawings, that show two forms of apparatus for carrying out the present method.

In the drawings:

Fig. 1 is a top plan view of an extruding nozzle constructed in accordance with the present invention.

Fig. 2 is a side or edge view of the nozzle of Fig. 1.

Fig. 3 is an end view of the nozzle looking towards the wide-span discharged slot of the nozzle.

Fig. 4 is a perspective view showing the extruding nozzle associated with a conveyor belt.

Fig. 5 is a diagrammatic plan view illustrating how the extruding nozzle of the present invention is constructed; and Fig. 6 is a perspective view of a modified type of nozzle.

The extruding nozzle employed in carrying out the method of the present invention and which is adapted to extrude a sheet of freshly formed latex foam that may be up to 5 feet wide or more is preferably made of metal that is thick enough to withstand, throughout the wide-span of the nozzle, the internal pressure exerted by the latex foam without being distorted by this pressure. This nozzle as shown has the foam receiving tubular portion 10 and the outwardly-flaring wide flat portion 11. The tubular portion 10 may be round as shown but preferably is square or rectangular in cross section adjacent the base of the wide flat portion 11. This square cross section at the base of the outwardly-flaring portion of the nozzle is desirable so that the volume of latex foam traveling through the tubular portion will enter the outwardly-flaring portion in such a manner that the same volume of foam will travel along the different outwardly-flaring radial paths to the end of the nozzle. The outwardly-flaring portion 11 has a top wall or plate 12 and a similar bottom wall or plate 13 that may be disposed parallel to the top plate, and these fan shaped plates are connected at their marginal edges by the upright walls 14. If the plates 12 and 13 are several feet wide near the discharge end of the nozzle, they may be readily sprung towards or from each other even if made of relatively thick metal. In order to reduce the likelihood of these plates being sprung under the internal pressure of the latex foam within the nozzle, it may be desirable to provide between these plates connecting bolts, such for example as the bolts 15 which are shown as having the heads counter-sunk in recesses in the plate 13 and a nut 16 upon the end portion of each bolt that extends through the plate 12. Preferably I use a number of equally-spaced bolts lying on spaced lines parallel with line 12.

Freshly formed latex foam containing a vulcanizing agent and a fast acting gelling agent may be supplied to the nozzles 10, 11 through a supply hose 17 which leads from a foam forming apparatus, not shown. The pressure of the foam within this hose 17 may be about 10 to 15 pounds per square inch or higher, but as this foam passes through the tubular portion 10 of the nozzle, and then spreads out to fill the outwardly-flaring portion 11 of the nozzle its pressure will decrease and the speed at which it travels in this outwardly-flaring portion will correspondingly decrease. The relative size of the portions 10 and 11 of the nozzle, the pressure at which the latex foam is supplied to the portion 10 of the nozzle, and the speed at which the foam is forced through the nozzle, should be such that by the time the foam reaches the wide-span discharge opening of the nozzle the pressure of this foam will have dropped very close to that of atmospheric pressure, provided, of course the nozzle is not overloaded for reasons mentioned previously. This is important because if the foam leaves the nozzle at a higher pressure at one point than at another, a larger volume will emerge at the high pressure point and most likely form a foam sheet of non-uniform thickness.

The wide flat extruding nozzle 10, 11 when in operating position preferably rests on the upper run 18 of an endless belt which travels in the direction indicated by the arrow in Fig. 4 from a supporting roller 19. During the operation of the apparatus shown in Fig. 4 the latex foam is supplied at uniform pressure to the nozzle 10, 11 by the supply hose 17, and the foam issues from the discharge end of this nozzle in a wide extruded sheet marked "Foam" which is deposited upon the advancing upper run 18 of the belt. The speed of the belt may be varied to help regulate the thickness of the foam sheet. If the volume of foam introduced into the foam receiving portion 10 is constant, the thickness may be varied by increasing or decreasing the speed of the belt 18. As the foam passes through the extruding nozzle the surfaces of the foam that contact the smooth inner walls of the outwardly-flaring portion 11 of the nozzle will undergo an ironing action that imparts to the upper and lower face of the extruded sheet a smooth flat surface, which is highly desirable. This deposited sheet remains upon the advancing belt 18 until it is gelled the desired amount, and then preferably passes through a heated chamber where it will be subjected to sufficient heat to vulcanize the foam.

As above stated, a special nozzle construction is required to extrude the latex foam so that it will produce a sheet of uniform thickness, this is due to the fact that the foam expands as the pressure thereon drops. The preferred construction of such nozzle is illustrated diagrammatically in Fig. 5, wherein the foam receiving tube portion 10 is shown much larger in proportion to the spread of the outwardly-flaring portion 11 than it need be in actual practice. It has been found in practice that a tube such as indicated by 10 having an internal diameter of 1½ inches will supply sufficient latex foam to produce a sheet of latex foam 6 feet wide and 1⅞" thick. In other words, for normal production it is not necessary to increase the diameter of the supply tube 17, or foam receiving portion 10.

Referring further to Fig. 5, let it be assumed that a central point A is selected in the tube 10 as the center of the arc of a circle indicated by the dot and dash line BDC. If the outwardly-flaring portion 11 of the nozzle should be so constructed that its discharge end terminates on this line BDC, then the sheet of extruded latex foam issuing from such nozzle would be non-uniform in thickness, as the sheet would be thicker near its outer edges than in the longitudinal central portion thereof. This is because the central portion of the stream must travel further from the plane XY to reach the arc BDC than the side portions of the stream. That is the foam travels through the squared portion of the tube 10 at a uniform rate and under a pressure of 10 pounds or more per square inch, until it reaches the line XY, whereupon it is subjected to a lateral spreading action in the nozzle that causes it to advance along diverging radial lines. At the time the foam leaves the transverse plane XY and spreads laterally in the nozzle, a rapid drop in its pressure occurs as the foam advances in this fan shaped nozzle. If the opposite walls 12 and 13 are disposed parallel to each other, then the drop in pressure in the foam will be substantially uniform throughout the laterally spreading stream for every inch the stream travels in this portion of the nozzle, and if some of the foam travels further than the rest the pressure drop will be unequal. It is therefore important that each portion of the stream shall travel the same distance from the transverse plane XY until it reaches the discharged end of the nozzle. To secure this uniform pressure drop the outer end of the nozzle 11 is given the curvature indicated by the line BEC, which is produced by drawing a number of radial lines outwardly from the point A, so as to provide the radial lines AB, AF, AG, AH, AI, AJ, and AC. Then taking the points where the plane XY intersect each of these radial lines, and measuring a distance such as KB along each radial line from the plane XY, the points B, F, G, H, I, J, C are secured. A curve drawn through these points, which is the curve BEC is the proper shape to be imparted to the discharge end of the nozzle 11 in order that each portion of the stream of latex foam flowing inside this nozzle will travel the same distance from the plane XY to the discharged end of the nozzle, and undergo the same pressure drop. This is how the extruding nozzle may be constructed so that when a compressible fluid such as freshly formed latex foam is extruded therefrom it will form a wide sheet of uniform thickness throughout. It will be understood however that as the width BC of the discharge opening is increased in proportion to the width of the inlet opening 10 the shape of the arc will more closely approach the true circular arc BDC. In a large extruder having an outlet 72" wide or so, and an inlet tube 1½" wide, the difference between the arc constructed as above described and a true circular arc may be ignored. If it were practical, the relative size of the inlet and outlet could be brought into proper relationship in a small extruder by changing the cross section of the inlet 10 to a rectangle, long in the vertical direction and narrow in the horizontal direction. This in effect would introduce the latex foam into the portion 11 in a flat vertical plane, so that the distance from any point along the width of the inlet to the opening 12 of circular arc shape would be practically equal. Such a construction is shown in Fig. 6 wherein the tubular portion 10 leads to the portion 20 the discharge end of which has the shape of a rectangle with its longer dimension extending vertically. The side walls 21 and 22 of this nozzle are spaced a substantial distance apart where they join such rectangular portion, and converge towards each other as shown as they approach the wide discharge end 23. As mentioned previously, the important consideration in the design of the nozzle is to provide means for equalizing the pressure to insure that the volume of foam extruded is equal along the entire length of the outlet.

It will be seen from the foregoing description that the apparatus employed in carrying out the present method is very simple in construction, and that it makes possible the use of a pressure feed for the foam whereby accurate control of the feed is secured from the time the latex is produced in the foaming apparatus until it is discharged from the extruding nozzle onto the conveyor belt. This accurate control of the pressure and feed of the foam reduces coagulation of the foam before it reaches the belt, and makes practical the use of a fast gelling agent, such as one that will cause the foam to gel in say 3 or 4 minutes. This produces a more uniform cell structure, and air from the atmosphere is prevented from being mixed with the foam as it travels to the belt. Furthermore the nozzle imparts to both faces of the extruded stream very smooth surfaces.

The thickness of the sheet deposited on the belt will depend largely upon the volume of foam introduced into the portion 10 of the nozzle. Variation in the volume will determine whether the sheet is thinner, equal to, or thicker than the width of the slot. It will also depend upon the belt speed as mentioned above. The extruding nozzle contemplated by the present invention is much easier and more satisfactory to operate than the so called "scraper and bank" system employed heretofore, and it produces a flatstock that is better in several ways over the flatstock produced by the methods used heretofore.

Having thus described my invention, what I claim and desire to protect by Letters Patent is:

1. Apparatus for forming a flat sheet of liquid foam that is uniform as to thickness, comprising an extruding nozzle for extruding freshly formed liquid foam, a source of foam under a number of pounds of pressure operatively connected to the nozzle, said nozzle having a tubular foam-receiving portion and an outwardly-flaring wide discharge portion of much greater cross-sectional area than said receiving portion and having spaced side walls and continuously diverging edge walls that connect the side walls and a curved outer end the entire curve of which lies an equal distance from a plane extending transversely to the base of said outwardly-flaring portion so that each portion of the foam stream leaves the nozzle under uniform pressure, and a traveling belt positioned to receive the foam stream as it leaves the nozzle.

2. Apparatus for forming a flat sheet of latex foam that is uniform as to thickness, comprising an extruding nozzle for extruding freshly formed latex foam containing closed cells that will change size with changes in pressure upon the foam, a source of foam under a number of pounds of pressure operatively connected to the nozzle, said nozzle having a tubular foam-receiving portion and an outwardly-flaring wide discharge portion of much greater cross-sectional area than said receiving portion and having spaced side walls and continuously diverging edge walls that connect the side walls and a curved outer end shaped so that each portion of the foam stream leaves the nozzle under uniform pressure, and a traveling belt positioned to receive the foam stream as it leaves the nozzle.

3. Apparatus for forming a flat sheet of liquid foam that is uniform as to thickness, comprising an extruding nozzle for extruding freshly formed liquid foam, a source of foam under a number of pounds of pressure operatively connected to the nozzle, said nozzle having a tubular foam-receiving portion and an outwardly-flaring wide flat discharge portion of much greater cross-sectional area than said receiving portion and having spaced side walls and continuously diverging edge walls that connect the side walls and a curved outer end shaped so that each portion of the foam stream undergoes the same pressure drop in this outwardly-flaring portion of the nozzle and leaves the nozzle under uniform pressure, and a traveling belt positioned to receive the foam stream as it leaves the nozzle.

4. The method of forming an extruded flat sheet of liquid foam that is uniform as to thickness, which comprises forcing freshly formed liquid foam under considerable pressure into an extruding nozzle which has a foam receiving portion and an outwardly flaring wide foam discharge portion of much greater cross sectional area than the foam receiving portion, passing the foam through the nozzle to spread laterally therein while reducing its pressure as it advances by advancing all portions of the foam stream the same distance from the foam receiving portion of the nozzle to the wide discharge portion of the nozzle so that the foam arrives at the discharge portion under uniform pressure across the wide discharge portion, and depositing the foam onto a support that is moving relative to the nozzle.

5. The method of forming an extruded flat sheet of liquid foam that is uniform as to thickness, which comprises forcing freshly formed liquid foam under considerable pressure into an extruding nozzle which has a foam receiving portion and a wide foam discharge slot of much greater cross sectional area than the foam receiving portion, passing the foam through the nozzle to spread laterally therein while reducing its pressure as it advances by advancing all portions of the foam stream the same distance from the foam receiving portion of the nozzle to the wide discharge portion of the nozzle so that it arrives at the discharge portion under uniform pressure across the slot and leaves the slot with less thickness than the thickness of the slot, and depositing said foam on a support that is moving relative to the nozzle.

6. The method of forming an extruded flat sheet of liquid foam that is uniform as to thickness, which comprises forcing freshly formed liquid foam under considerable pressure into an extruding nozzle which has a foam receiving portion and a wide foam discharge portion of much greater cross sectional area than the foam receiving portion, passing the foam through the nozzle to spread laterally therein while reducing its pressure as it advances by advancing all portions of the foam stream the same distance from the foam receiving portion of the nozzle to the wide discharge portion of the nozzle so that it arrives at the discharge portion under uniform pressure across the wide discharge portion, discharging the foam from a nozle at a pressure that is above the ambient pressure so that the extruded foam expands uniformly after it leaves the nozzle to a greater thickness than the thickness of the discharge portion of the nozzle, and depositing the foam onto a support that is moving relative to the nozzle.

References Cited in the file of this patent

UNITED STATES PATENTS

| | | |
|---|---|---|
| 2,567,949 | Lewis | Sept. 18, 1951 |
| 2,572,677 | Tench | Oct. 23, 1951 |

FOREIGN PATENTS

| | | |
|---|---|---|
| 374,148 | Great Britain | June 6, 1932 |